(12) United States Patent
Hernandez et al.

(10) Patent No.: US 11,663,338 B2
(45) Date of Patent: May 30, 2023

(54) AUTOMATED SECURITY ANALYSIS OF BASEBAND FIRMWARE

(71) Applicant: University of Florida Research Foundation, Inc., Gainesville, FL (US)

(72) Inventors: Grant Haydock Hernandez, Gainesville, FL (US); Kevin R. Butler, Gainesville, FL (US); Patrick G. Traynor, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 381 days.

(21) Appl. No.: 15/931,855

(22) Filed: May 14, 2020

(65) Prior Publication Data
US 2020/0364135 A1 Nov. 19, 2020

Related U.S. Application Data

(60) Provisional application No. 62/847,429, filed on May 14, 2019.

(51) Int. Cl.
*G06F 21/57* (2013.01)
*G06F 11/36* (2006.01)
(Continued)

(52) U.S. Cl.
CPC ........ *G06F 21/577* (2013.01); *G06F 11/3688* (2013.01); *H04W 28/065* (2013.01); *G06F 21/57* (2013.01); *H04W 92/10* (2013.01)

(58) Field of Classification Search
CPC .... G06F 21/577; G06F 21/57; G06F 11/3684; H04W 28/065; H04W 92/10; H04W 8/245; H04W 24/06
See application file for complete search history.

(56) References Cited

U.S. PATENT DOCUMENTS 8,495,626 B1 * 7/2013 Hanes ................ G06F 11/3656
717/178
9,436,491 B1 * 9/2016 Chiou ................ G06F 9/45558
(Continued)

FOREIGN PATENT DOCUMENTS

CN 101233769 A * 7/2008 ............. G06F 21/57
CN 106991326 A * 7/2017
(Continued)

OTHER PUBLICATIONS

"Touching the Untouchables: Dynamic Security Analysis of the LTE Control Plane" by H. Kim et al., 2019 IEEE Symposium on Security and Privacy, May 2019.

*Primary Examiner* — Sarah Su
(74) *Attorney, Agent, or Firm* — Thomas | Horstemeyer, LLP

(57) ABSTRACT

Various examples are provided related to automated security analysis of baseband firmware. In one example, a system includes a wireless front end and processing circuitry communicatively coupled to the wireless front end and a target device. The processing circuitry can generate mutated packets based upon a device state of the target device; provide the mutated packets for transmission to the target device; receive feedback information from the target device in response to reception of the mutated packets; and identify a firmware flaw associated with the target device in response to the feedback information. In another example, a method includes generating mutated packets based upon a device state of a target device; transmitting the mutated packets to the target device; receiving feedback information from the target device in response to reception of the mutated packets; and identifying a firmware flaw associated with the target device using the feedback information.

18 Claims, 3 Drawing Sheets

(51) Int. Cl.
    *H04W 28/06*     (2009.01)
    *H04W 92/10*     (2009.01)

(56) References Cited

U.S. PATENT DOCUMENTS

| | | | | |
|---|---|---|---|---|
| 11,349,963 | B1* | 5/2022 | Chattopadhyay | H04L 69/329 |
| 2015/0350235 | A1* | 12/2015 | Kim | G06F 21/577 |
| | | | | 726/25 |
| 2019/0332481 | A1* | 10/2019 | Kulick | G06F 11/366 |
| 2020/0371976 | A1* | 11/2020 | Partlow | G06F 11/0772 |
| 2022/0075543 | A1* | 3/2022 | Jang | G06F 3/0679 |

FOREIGN PATENT DOCUMENTS

| | | | | | |
|---|---|---|---|---|---|
| CN | 113330436 | A | * | 8/2021 | G06F 21/552 |
| KR | 20180086833 | A | * | 8/2018 | H04L 43/50 |
| KR | 20190036779 | A | * | 4/2019 | H04L 63/306 |
| KR | 20220050290 | A | * | 4/2022 | |
| WO | WO-03107700 | A1 | * | 12/2003 | H04W 8/245 |
| WO | WO-2010150047 | A1 | * | 12/2010 | G06F 21/56 |
| WO | WO-2012049757 | A1 | * | 4/2012 | G06F 21/10 |
| WO | WO-2014182159 | A1 | * | 11/2014 | G06F 11/1433 |
| WO | WO-2015047112 | A1 | * | 4/2015 | G06F 15/7807 |

* cited by examiner

AUTOMATED SECURITY ANALYSIS OF BASEBAND FIRMWARE

CROSS REFERENCE TO RELATED APPLICATIONS

This application claims priority to, and the benefit of, U.S. provisional application entitled "BASEBADS: Automated Security Analysis of Baseband Firmware" having Ser. No. 62/847,429, filed May 14, 2019, which is hereby incorporated by reference in its entirety.

STATEMENT REGARDING FEDERALLY SPONSORED RESEARCH OR DEVELOPMENT

This invention was made with government support under 1815883 awarded by the National Science Foundation. The government has certain rights in the invention.

BACKGROUND

As mobile devices became ubiquitous in modern society, so did the demand for improved mobility. Since the transition from first-generation (1G) pure analog signaling to digital (2G) systems, cellular standards have successively improved data rates, operational range, and overall reliability. Mobile devices are more connected than ever before through the use of multiple wireless protocols, including the 2G, 3G, and 4G cellular standards. To manage and interact with cellular networks, phones use dedicated and highly proprietary baseband processors running custom, closed-source firmware. Despite the increasing complexity of modern cellular standards, there is no reference implementation, leading individual baseband manufacturers to create their own in-house versions. The proprietary nature of baseband firmware combined with the complexity of standards has created a barrier for researchers to comprehensively audit the security of these implementations.

SUMMARY

Aspects of the present disclosure are related to automated security analysis of baseband firmware, systems and applications thereof.

In one aspect, among others, a system comprises a wireless front end and processing circuitry communicatively coupled to the wireless front end; and to at least one target device, the processing circuitry configured to: generate mutated packets based upon a device state of the at least one target device; provide the mutated packets to the wireless front end for transmission to the at least one target device; receive feedback information from the at least one target device in response to reception of the mutated packets; and identify a firmware flaw associated with the at least one target device in response to the feedback information. In one or more aspects, the wireless front end can be a cellular base station or a software defined radio (SDR). The at least one target device can comprise a cellular device. The cellular device can be a cellular telephone.

In various aspects, the mutated packets can be generated by fuzzing GSM or GPRS Layer 3 message frames. The processing circuitry can be configured to obtain the device state of the at least one target device prior to generating the mutated packets. The processing circuitry can be communicatively coupled to the at least one target device via a wired connection. The feedback information can comprise logs, packets or a combination thereof. The processing circuitry can comprise a processor and memory, and a security analysis application executed by the processor can cause the processing circuitry to generate the mutated packets, provide the mutated packets for transmission, and identify the firmware flaw.

In another aspect, a method comprises generating mutated packets based upon a device state of at least one target device; transmitting the mutated packets to the at least one target device; receiving feedback information from the at least one target device in response to reception of the mutated packets; and identifying a firmware flaw associated with the at least one target device based at least in part upon the feedback information. In one or more aspects, the mutated packets can be wirelessly transmitted by a cellular base station. The mutated packets can be transmitted by a software defined radio (SDR). The at least one target device can comprise a cellular user device. The mutated packets can be generated by fuzzing GSM or GPRS Layer 3 message frames. In various aspects, the device state can be determined prior to generating the mutated packets. The feedback information from the at least one target device can be received via a wired connection with the at least one target device. The feedback information can comprise logs, packets or a combination thereof.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
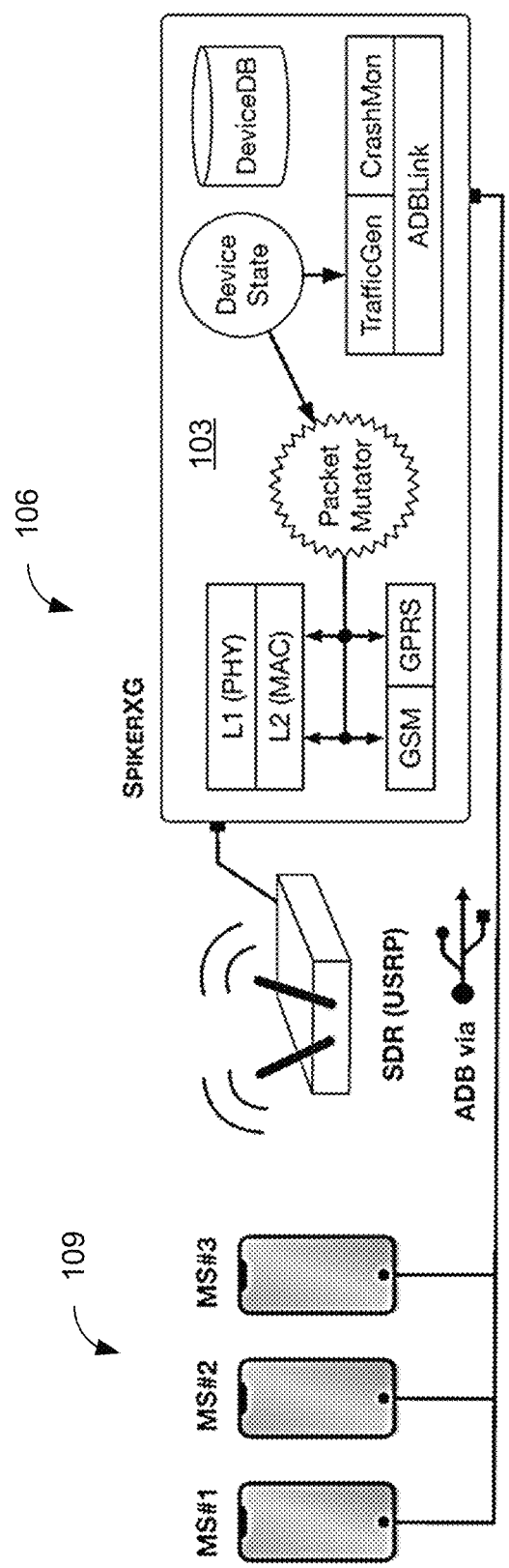
FIG. 1A is a schematic diagram illustrating an example of a baseband platform, in accordance with various embodiments of the present disclosure.

Disclosed herein are various examples related to automated security analysis of baseband firmware, systems and applications thereof. To provide appropriate levels of cellular service, network operators have adopted new infrastructure and purchased additional resources. On the mobile device side, each generational change has required a corresponding leap forward in processing power and signal processing. Today, cellular functions on smartphones are realized through dedicated cellular processors, also known as basebands. These basebands are specialized, stand-alone, chips that implement the 2G, 3G, 4G, and upcoming 5G standards. As such, they run complex embedded software, known as firmware.

The firmware facilitates the mobile device functionality as it is responsible for decoding and encoding all over-the-air messages, managing calls, exchanging text messages, and establishing data connections. Given the responsibilities of the baseband firmware, its integrity can also provide protection for sensitive data residing on the device and prevention against wide-scale attacks. Unfortunately, most if not all commercial baseband firmware is proprietary and closed source, slowing down external security assessments. Worse, previous research has taken an ad-hoc approach to baseband security, leaving many questions unanswered. These barriers and limited approaches have stymied research into the overall trustworthiness of baseband processors and their firmware.

Work focusing on revealing cellular processor flaws has sporadically taken place over the years. One of the earliest works demonstrated a method to generate invalid SMS messages on a local device to test its robustness. This work was extended to illustrate that remote SMS attacks against mobile devices are possible, but the focus was not primarily on smartphones. Following work demonstrated that even more damaging remote attacks are possible over-the-air due to baseband memory corruption. The relative insecurity of baseband processors was highlighted when compared to application processors, due to their lack of hardening against memory corruption. Unfortunately, this was limited to two phones and did not capture the whole baseband space.

Similar work tests device GSM implementations, but only focuses on SMS and cell broadcast traffic. No systematic approach is taken. T-Fuzz takes a model-based approach to telecommunication protocol testing, but fails to taxnomize the found unwanted behavior, leading to a lack of understanding of the real impact. LTE implementations typically focus on the protocol state machine level and may not capture all classes of implementation flaws. Recent work confirms that remote attacks may still be found in baseband implementations. Another approach creates an emulated environment for device testing, but does not address the root causes of the issues found.

To address the barrier to comprehensively auditing the security of these proprietary baseband processors running custom, closed-source firmware, an extensible baseband testing platform or framework (referred to as "SPIKERXG") is presented that can employ firmware instrumentation to intelligently target protocol messages. The framework aims to test many baseband implementations through over-the-air protocol manipulation. By understanding how basebands fail across vendors and cellular protocols, we can understand the overall security posture of baseband firmware. To target the firmware, AVATAR2, which interoperates well with QEMU and popular symbolic execution and binary analysis frameworks, can be utilized.

SPIKERXG can create baseband specific machine and interface definitions in order to inject over-the-air packets directly into the firmware. This can be challenging and can use reverse engineering tools to determine the firmware format and input/output (I/O). The benefit to this approach is that, unlike purely dynamic testing, symbolic execution and other powerful techniques can be employed. This can serve to get a more detailed view of program flaws in order to determine their exploitability and their reproducibility in a real setting. Reference will now be made in detail to the description of the embodiments as illustrated in the drawings, wherein like reference numbers indicate like parts throughout the several views.

Every mobile station (MS) has a chip called a baseband that does the raw processing of over the air messages. Basebands/modems/cellular processors implement the cellular protocol in the MS. Basebands are responsible for functions like attaching and detaching to a base transceiver station (BTS) and sending/receiving calls, SMS messages, and data. This market is dominated by Qualcomm, Samsung, Intel, and Mediatek. The cellular processor (CP) can be its own standalone chip or on the same chip as the application processor (AP). The AP is responsible for running the operating system that a user typically interfaces with. AP's have been hardened significantly over the past several years. Countermeasures such as address space layout randomization and non-executable memory have been employed to defend against various types of exploitation. CPs, however, do not have these mitigations which makes them vulnerable to otherwise less harmful bugs. This can be important since device integrity relies on both chips.

Each manufacturer has their own firmware which is proprietary. These various interpretations of the cellular protocol are likely littered with undiscovered bugs because how difficult it is to access the baseband. As a result, there has likely never been a proper white box security audit conducted apart from the manufacturers.

Referring to FIG. 1A, shown is an example of a baseband testing platform or framework (SPIKERXG) 103. As shown in FIG. 1A, the SPIKERXG 103 creates a feedback loop with a cellular base station 106 and target devices 109 to automatically test baseband processors for implementation flaws. The methodology of SPIKERXG is independent of any individual implementation of a cellular protocol, but as a proof of concept, the approach was applied to the 2G protocol. The cellular base station 106 can provide a wireless front end. For the cellular base station back end, a BTS (e.g., YateBTS, yatebts.com) was chosen. The cellular base station 106 comprises processing circuitry including at least one processor and memory. The core of the BTS was written in C++ and SPIKERXG in Python 3.7 for portability and ease of development. SPIKERXG 103 connects to the BTS through an instrumented control and data path, which allows for the cellular base station 106 to be remotely administered and for over-the-air packets to be inspected or modified by SPIKERXG logic. These control and data paths are created via persistent socket connections for speed. Target devices 109 can include user devices such as, but not limited to, cellular devices including smartphones, tablets, etc.

At its core, SPIKERXG 103 mutates packets leaving the cellular base station 106 to wirelessly communicated. The SPIKERXG 103 can completely mediate all packets leaving the cellular base station (downlink), with the exception of any multicast control channels, such as the broadcast control channel (BCCH). Mutating packets should be avoided on broadcast channels due to the difficulty in suppressing them from innocent devices. Instead PDUs directed to a single device (unicast) can be targeted. As such, the focus can be on fuzzing the global system for mobile communications (GSM) and general packet radio services (GPRS) of Layer 3 (L3 network layer) message frames, which need a Layer 2 (L2 data link layer) connection to be established to a single device. To detect and manage devices without user interaction the SPIKERXG 103 can incorporate device feedback in the form of logs and packets. To meet the goal of automatically fuzzing devices over-the-air, the fuzzing portion of SPIKERXG can operate with knowledge of the device state. This allows for detecting device anomalies such as modem crashes, reboots, hangs, and other runtime errors.

Using the SPIKERXG 103, it is possible to simultaneously fuzz multiple devices (e.g., Android devices) 109 over-the-air. During testing, this led to discovery of two remote crashes in the 2G protocol implementations for the Intel and Exynos baseband processors. The affected phones 109 were an ASUS ZenPhone 2 and Samsung S7 EDGE. These crashes caused a complete device reboot and were found in less than six hours of fuzzing.

The initial proof of concept with SPIKERXG 103 was solely focused on dynamic testing, but this approach has limitations in the types of flaws that can be automatically found. As such, the focus can be on scaling up the testing process by focusing on the baseband firmware itself. To target the firmware, AVATAR2 can be used, which interoperates well with QEMU and popular symbolic execution and binary analysis frameworks. SPIKERXG 103 can create baseband-specific machine and interface definitions in order to inject over-the-air packets directly into the firmware. Reverse engineering tools may be used to determine the firmware format and input/output (I/O). One benefit to this approach can be that, unlike purely dynamic testing, symbolic execution and other powerful techniques can be employed. This can provide a more detailed view of program flaws in order to determine their exploitability and their reproducibility in a real setting.

The baseband testing platform or framework (SPIKERXG) 103 of certain embodiments of the present disclosure can be implemented in hardware, software, firmware, or a combination thereof. In the preferred embodiment(s), the SPIKERXG 103 can be implemented in software or firmware that is stored in a memory and that is executed by a suitable instruction execution system. If implemented in hardware, as in an alternative embodiment, the baseband testing platform or framework 103 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The SPIKERXG 103 can be implemented by a security analysis application executable by the processing circuitry, which can comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present disclosure includes embodying the functionality of the preferred embodiments of the present disclosure in logic embodied in hardware or software-configured mediums.

Figure 1B:
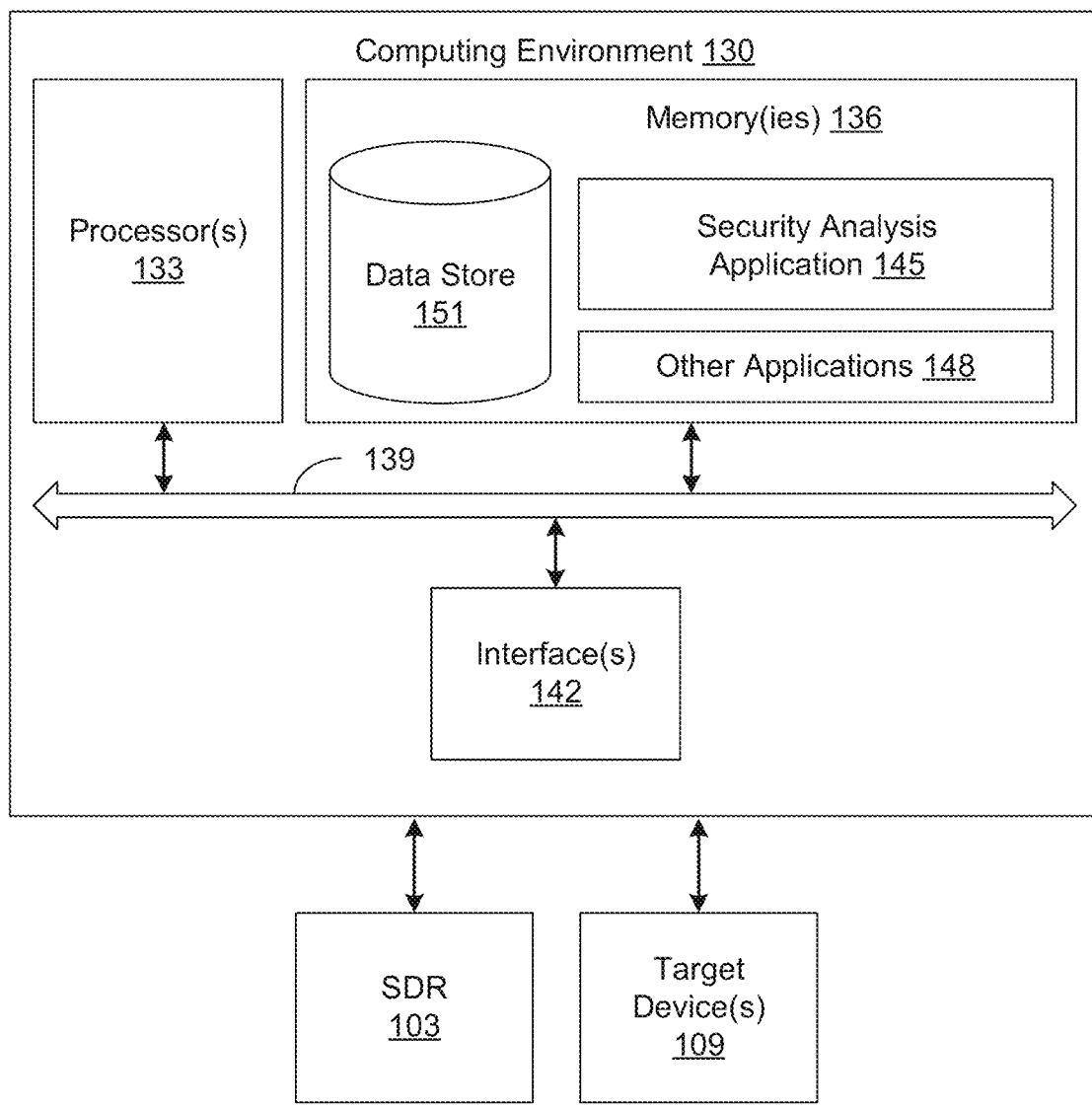
FIG. 1B is a schematic block diagram illustrating an example of a computing environment 130 that can be utilized for implementation of the baseband platform of FIG. 1A, in accordance with various embodiments of the present disclosure.

Referring to FIG. 1B, shown is a schematic block diagram illustrating an example of a computing environment 130 that can be utilized for implementation of the baseband testing platform or framework (SPIKERXG) 103. In some embodiments, among others, the computing environment 130 may comprise one or more computing device such as, e.g., a smartphone, tablet, computer, etc. The computing environment 130 includes at least one processor circuit, for example, having a processor 133 and a memory 136, both of which are coupled to a local interface 139. To this end, the computing environment 130 may comprise, for example, at least one server computer or like device, which can be utilized in a cloud based environment. The local interface 139 may comprise, for example, a data bus with an accompanying address/control bus or other bus structure as can be appreciated.

In some embodiments, the computing environment 130 can include one or more interfaces 142 (e.g., network interfaces, USB interfaces, etc.). The interface 142 may comprise, for example, a wireless transmitter, a wireless transceiver, and/or a wireless receiver. The interface 142 can communicate to a remote computing device or other components using a Bluetooth, WiFi, or other appropriate wireless protocol. As one skilled in the art can appreciate, other wireless protocols may be used in the various embodiments of the present disclosure. The interface 142 can also be configured for communications through wired connections. In addition, the computing environment 130 can be in communication with, e.g., a SDR 103 and target device(s) 109, such as the example in FIG. 1A.

Stored in the memory 136 are both data and several components that are executable by the processor(s) 133. In particular, stored in the memory 136 and executable by the processor 133 can a security analysis application 145, and potentially other applications 148. In this respect, the term "executable" means a program file that is in a form that can ultimately be run by the processor(s) 133. Also stored in the memory 136 may be a data store 151, database and other data. In addition, an operating system may be stored in the memory 136 and executable by the processor(s) 133. It is understood that there may be other applications that are stored in the memory 136 and are executable by the processor(s) 133 as can be appreciated.

Examples of executable programs may be, for example, a compiled program that can be translated into machine code in a format that can be loaded into a random access portion of the memory 136 and run by the processor(s) 133, source code that may be expressed in proper format such as object code that is capable of being loaded into a random access portion of the memory 136 and executed by the processor(s) 133, or source code that may be interpreted by another executable program to generate instructions in a random access portion of the memory 136 to be executed by the processor(s) 133, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The memory 136 is defined herein as including both volatile and nonvolatile memory and data storage components. Volatile components are those that do not retain data values upon loss of power. Nonvolatile components are those that retain data upon a loss of power. Thus, the memory 136 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 133 may represent multiple processors 133 and/or multiple processor cores, and the memory 136 may represent multiple memories 136 that operate in parallel processing circuits, respectively. In such a case, the local interface 139 may be an appropriate network that facilitates communication between any two of the multiple processors 133, between any processor 133 and any of the memories 136, or between any two of the memories 136, etc. The local interface 139 may comprise additional systems designed to coordinate this communication, including, for example, performing load balancing. The processor 133 may be of electrical or of some other available construction.

Although the security analysis application 145, and other various applications 148 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the security analysis application 145, that comprises software or code can be embodied in any non-transitory computer-readable medium for use by or in connection with an instruction execution system such as, for example, a processor 133 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the security analysis application 145, may be implemented and structured in a variety of ways. For example, one or more applications described may be implemented as modules or components of a single application. For example, the security analysis application 145 can include a wide range of modules such as, e.g., a wheel grip module, a wheelchair control module, or other modules that can provide specific functionality to the simulated environment. Further, one or more applications described herein may be executed in shared or separate computing devices or a combination thereof. For example, a plurality of the applications described herein may execute in the same computing environment 130, or in multiple computing devices in the same computing environment.

Figure 2:
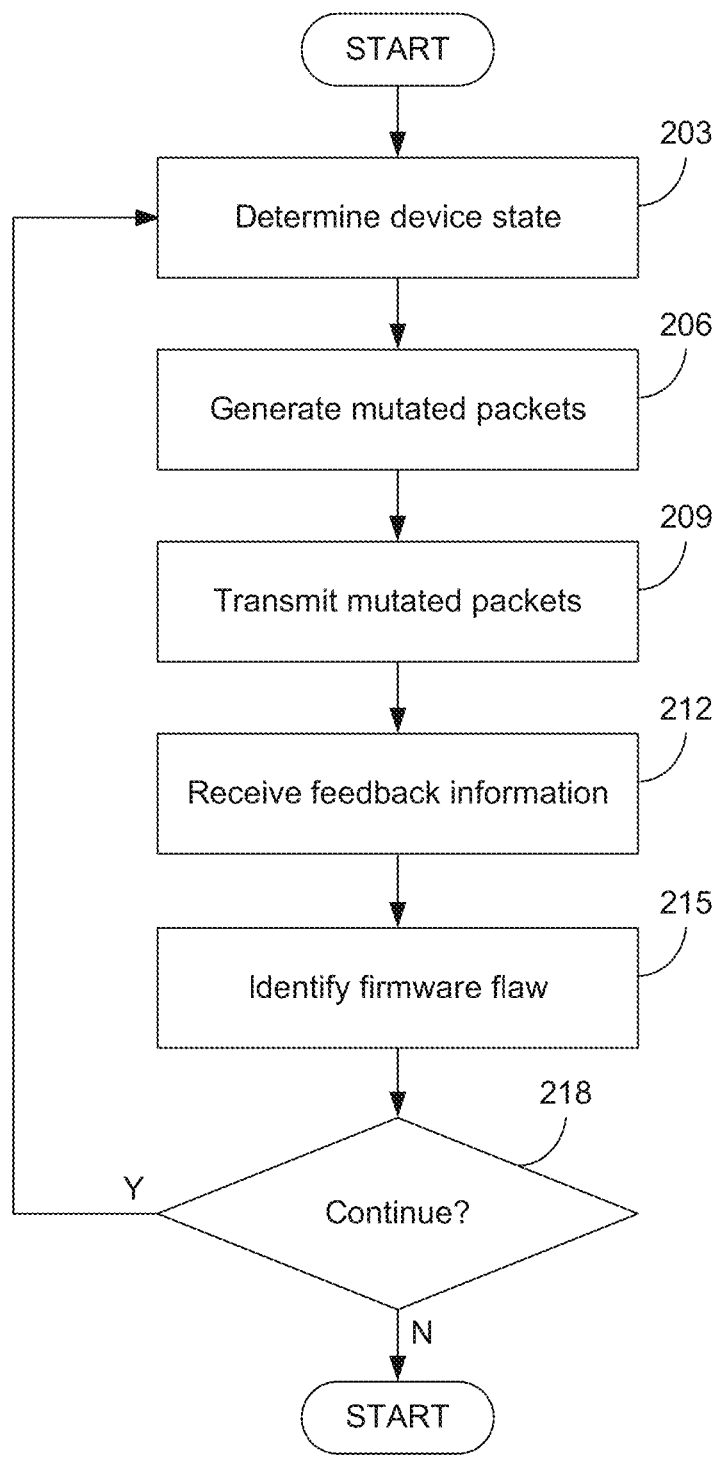
FIG. 2 is a flow chart illustrating an example of baseband security analysis, in accordance with various embodiments of the present disclosure.

Referring now to FIG. 2, shown is a flow chart illustrating an example of security analysis of baseband firmware, systems and applications thereof. Beginning at 203, a device state can be determined for at least one target device. The target device can comprise a cellular user device such as, e.g., a smartphone or other cellular communication device. Mutated packets can be generated at 206 based upon a device state of at least one target device. The mutated packets can be generated by, e.g., fuzzing GSM or GPRS Layer 3 message frames. At 209, the mutated packets can be transmitted to the at least one target device. For example, the mutated packets can be wirelessly transmitted by a cellular base station or can be transmitted by a software defined radio (SDR).

At 212, feedback information can be received from the at least one target device in response to reception of the mutated packets. The feedback information from the target device(s) can be received via a wired connection or a wireless connection. The feedback information can comprise logs, packets or a combination thereof. A firmware flaw associated with the at least one target device can be identified at 215 based at least in part upon the feedback information. If it is determined at 218 that the analysis should be continued, then the flow can return to 203 (or to 206) for further processing.

The flow chart of FIG. 2 illustrates the architecture, functionality, and operation of a possible implementation of the security analysis application 145 (FIG. 1B). In this regard, each block can represent a module, segment, or portion of code, which comprises one or more executable instructions for implementing the specified logical function(s). It should also be noted that in some alternative implementations, the functions noted in the blocks may occur out of the order noted in FIG. 2. For example, two blocks shown in succession in FIG. 2 may in fact be executed substantially concurrently or the blocks may sometimes be executed in the reverse order, depending upon the functionality involved.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A system, comprising:
    a wireless front end; and
    processing circuitry communicatively coupled to the wireless front end and to at least one target device, the processing circuitry configured to:
        generate mutated packets based upon a device state of the at least one target device;
        provide the mutated packets to the wireless front end for transmission to the at least one target device;
        receive feedback information from the at least one target device in response to reception of the mutated packets; and
        identify a firmware flaw associated with the at least one target device in response to the feedback information.

2. The system of claim 1, wherein the wireless front end is a cellular base station.

3. The system of claim 1, wherein the wireless front end is a software defined radio (SDR).

4. The system of claim 1, wherein the at least one target device comprises a cellular device.

5. The system of claim 4, wherein the cellular device is a cellular telephone.

6. The system of claim 1, wherein the mutated packets are generated by fuzzing GSM or GPRS Layer 3 message frames.

7. The system of claim 1, wherein the processing circuitry is configured to obtain the device state of the at least one target device prior to generating the mutated packets.

8. The system of claim 1, wherein the processing circuitry is communicatively coupled to the at least one target device via a wired connection.

9. The system of claim 1, wherein the feedback information comprises logs, packets or a combination thereof.

10. The system of claim 1, wherein the processing circuitry comprises a processor and memory, and a security analysis application executed by the processor causes the processing circuitry to generate the mutated packets, provide the mutated packets for transmission, and identify the firmware flaw.

11. A method, comprising:
    generating mutated packets based upon a device state of at least one target device;
    transmitting the mutated packets to the at least one target device;
    receiving feedback information from the at least one target device in response to reception of the mutated packets; and
    identifying a firmware flaw associated with the at least one target device based at least in part upon the feedback information.

12. The method of claim 11, wherein the mutated packets are wirelessly transmitted by a cellular base station.

13. The method of claim 11, wherein the mutated packets are transmitted by a software defined radio (SDR).

14. The method of claim 11, wherein the at least one target device comprises a cellular user device.

15. The method of claim 11, wherein the mutated packets are generated by fuzzing GSM or GPRS Layer 3 message frames.

16. The method of claim 11, wherein the device state is determined prior to generating the mutated packets.

17. The method of claim 11, wherein the feedback information from the at least one target device is received via a wired connection with the at least one target device.

18. The method of claim 11, wherein the feedback information comprises logs, packets or a combination thereof.

* * * * *